United States Patent
Sankavaram et al.

(10) Patent No.: US 10,316,812 B2
(45) Date of Patent: Jun. 11, 2019

(54) HIERARCHICAL FAULT DIAGNOSIS AND PROGNOSIS OF A SYSTEM

(71) Applicant: GM GLOBAL TECHNOLOGY OPERATIONS LLC, Detroit, MI (US)

(72) Inventors: Chaitanya Sankavaram, Sterling Heights, MI (US); Shengbing Jiang, Rochester Hills, MI (US); Xinyu Du, Oakland Township, MI (US); Yilu Zhang, Northville, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 135 days.

(21) Appl. No.: 15/492,672

(22) Filed: Apr. 20, 2017

(65) Prior Publication Data

US 2018/0306160 A1   Oct. 25, 2018

(51) Int. Cl.
| | |
|---|---|
| *F02N 11/10* | (2006.01) |
| *F02N 11/08* | (2006.01) |
| *G01M 15/05* | (2006.01) |
| *G07C 5/00* | (2006.01) |
| *G07C 5/08* | (2006.01) |

(52) U.S. Cl.
CPC ........ *F02N 11/108* (2013.01); *F02N 11/0848* (2013.01); *G01M 15/05* (2013.01); *G07C 5/008* (2013.01); *G07C 5/085* (2013.01); *G07C 5/0808* (2013.01)

(58) Field of Classification Search
CPC .. F02N 11/108; F02N 11/0848; G01M 15/05; G07C 5/008; G07C 5/0808; G07C 5/085
See application file for complete search history.

(56) References Cited

U.S. PATENT DOCUMENTS

| | | | | |
|---|---|---|---|---|
| 2009/0192700 A1* | 7/2009 | Votoupal | ................ | F02N 11/10 701/113 |
| 2010/0175656 A1* | 7/2010 | Doub | ...................... | F02N 11/10 123/179.3 |
| 2015/0269793 A1* | 9/2015 | Collins | ................ | G07C 5/0808 701/31.4 |
| 2015/0361941 A1* | 12/2015 | Du | ........................ | F02N 11/108 702/33 |
| 2016/0102626 A1* | 4/2016 | Johansson | ............. | G01M 15/05 701/114 |
| 2016/0217628 A1* | 7/2016 | Ghoneim | ........... | G05B 23/0245 |
| 2016/0377014 A1* | 12/2016 | Books | ................. | F02N 11/0848 123/179.14 |
| 2017/0024943 A1* | 1/2017 | Wodecki | .............. | G07C 5/0808 |

* cited by examiner

*Primary Examiner* — Courtney D Heinle
(74) *Attorney, Agent, or Firm* — Quinn IP Law

(57) ABSTRACT

A method for diagnosing a fault mode in a system includes recording a hierarchical precedence rule assigning a priority level to fault modes of the system, and recording, in a fault report matrix, fault reports indicative of a corresponding one or more of the fault modes. The method also includes using the hierarchical precedence rule to determine the assigned relative priority level for the fault reports in response to a predetermined condition, e.g., a requested engine starting event, and identifying a root cause subsystem as a subsystem having the highest assigned priority level. A control action executed via the controller identifies the root cause subsystem by recording a diagnostic code and/or transmitting a message. The system is also disclosed, as is a computer-readable medium programmed with instructions embodying the method.

20 Claims, 2 Drawing Sheets

HIERARCHICAL FAULT DIAGNOSIS AND PROGNOSIS OF A SYSTEM

INTRODUCTION

Internal combustion engines are often used as torque-generating devices in vehicles, power plants, and a wide range of other systems. In general, a starter motor may be energized during an engine starting operation to crank the engine to a threshold starting speed sufficient for drawing a mixture of fuel and air into the engine's cylinders. As part of the starter circuit, a starter solenoid may be activated in response to motion of an ignition key or depression of a start button. Rotation of the ignition key or depression of the start button requests closing of the starter circuit and delivery of an electrical current from an auxiliary battery to the starter solenoid. The energized starter solenoid closes a switch to allow the battery current to energize the starter motor and commence cranking of the engine.

When the starter motor is fully energized, a pinion gear of the starter translates into meshed engagement with an engine flywheel, with output torque from the starter motor rotating the flywheel to the threshold starting speed. The solenoid then disengages the pinion gear from the flywheel when the engine has successfully started. A fuel delivery system thereafter feeds fuel into the engine's cylinders to sustain engine rotation via regulation of the internal combustion process.

Control of an engine starting system and other systems involves the complex interaction of multiple different subsystems, as well as communication with associated electronic control units, communications links, electrical switches, and relays. For instance, the engine starting function described above involves control of various subsystems such as the auxiliary battery and a connected power distribution system, starter solenoid, starter motor, and fuel delivery system. Engine parameters are also closely monitored and controlled to ensure proper operation. Degradation of a given interconnected subsystem or subsystem-level electronic control unit may affect the performance of one or more interconnected subsystems, possibly resulting in a reported fault mode, e.g., a "no-start" or "no-crank" fault in the example engine starting function noted above. While various approaches exist for detecting a fault mode in a given subsystem, there remains a need for holistic consideration of the system and its constituent subsystems when isolating a root cause of a given failure mode.

SUMMARY

A method is disclosed herein for diagnosing the state of health of a system having multiple subsystems or components, e.g., an engine starting system as described herein, and for identifying a "root cause subsystem" as a likely root cause of an impending or present system fault mode. Different fault modes may occur in different systems. Due to the nature of the various subsystems constituting a given system, degradation of one or more subsystems may adversely affect the performance of other subsystems or a state of health of the system as a whole. Hence, new types of fault modes may emerge over time as a result of complex interaction of the subsystems. For example, a faulty auxiliary battery may result in an extended engine crank time, which in turn may impair the performance or structural integrity of the starter motor.

The present approach is intended to improve upon existing methodologies that are limited to diagnosing the performance of a subsystem, such as by using individual subsystem-specific controllers to compare measured parameters to calibrated values. For instance, individual algorithms may be used to separately diagnose the auxiliary battery, starter motor, or fuel delivery system. The method disclosed herein may compliment such subsystem-focused techniques. Specifically, the method operates by assigning a hierarchical priority level to multiple possible fault modes. The root cause of a particular failure mode may be identified using the assigned priority level and a fault report matrix. Thereafter, an appropriate control action may be executed in response to the identified root cause. Thus, states of health of the individual subsystems are determined and thereafter evaluated according to an assigned hierarchical order of precedence, with the least healthy of the subsystems identified and acted upon as the most likely root cause of the fault mode.

An example method for diagnosing a fault mode in a system having multiple subsystems includes recording, in memory of a controller, a hierarchical precedence rule that assigns a relative priority level to a plurality of fault modes of the system. The method also includes recording, in a fault report matrix, one or more fault reports indicative of a corresponding one or more of the fault modes, and then using the hierarchical precedence rule to determine the assigned relative priority level for the fault reports.

Furthermore, the method may include identifying a root cause subsystem of the system, i.e., a subsystem having the highest of the assigned priority levels, and then executing a control action with respect to the system via the controller responsive to the identified root cause subsystem. The control action may include recording a diagnostic code and/or transmitting a message indicative of the identified root cause subsystem. Thus, the present holistic method is intended as an improvement to the operation and function of existing diagnostic machines and processes, making the overall diagnostic and prognosis of the system more efficient and useful relative to subsystem-focused methodologies.

Recording the fault reports may include recording one or more fault reports for corresponding subsystems, with the reports provided from electronic control units corresponding to such subsystems, and/or recording a subsystem fault report identifying a detected fault mode or state of health of one or more of the subsystems.

The predetermined event in an example engine starting application may be an ignition cycle or a key cycle initiating operation of the system. The subsystems in such an engine starting application may include an auxiliary battery, a starter motor, a starter solenoid, an alternator, and a fuel delivery system.

A system is also disclosed that includes a plurality of subsystems, at least one of which includes an electronic control unit operable, when active, for outputting an embedded fault report indicative of a fault mode of the corresponding subsystem. When the electronic control unit is not operable, this may be indicated by an absence of such an embedded fault report. The system also includes a controller in communication with the various subsystems. The controller is programmed with a hierarchical precedence rule that assigns a relative priority level to a plurality of system fault modes, and is configured to diagnose a fault mode of the system by executing the method noted above.

Also disclosed herein is a computer-readable medium on which is recorded a hierarchical precedence rule that assigns a relative priority level to a plurality of fault modes of a system and diagnostic instructions, the execution of which by a controller causes the controller to execute the method noted above.

The above features and advantages, and other features and advantages of the present disclosure, will be readily apparent from the following detailed description of the embodiments and best modes for carrying out the disclosure when taken in connection with the accompanying drawings and appended claims.

DETAILED DESCRIPTION

Figures 1, 2:
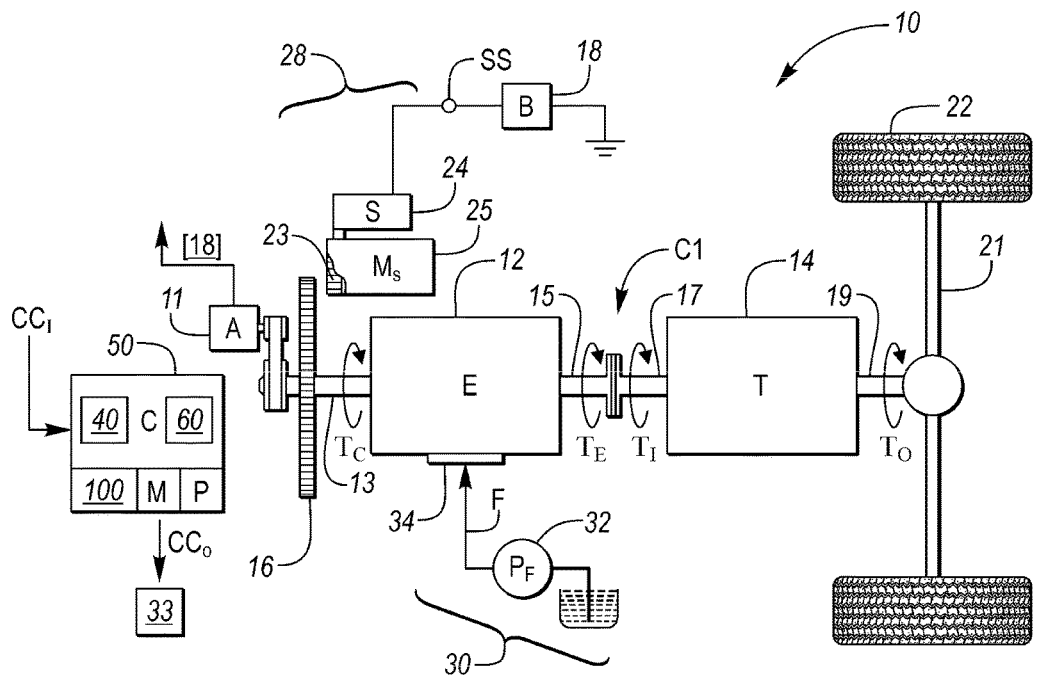
FIG. 1 is a simplified schematic illustration of a vehicle and a controller programmed to execute a method for diagnosing and evaluating an example engine starting system.
FIG. 2 is a representative fault report matrix that may be populated and used as part of the present method.
Figure 4:
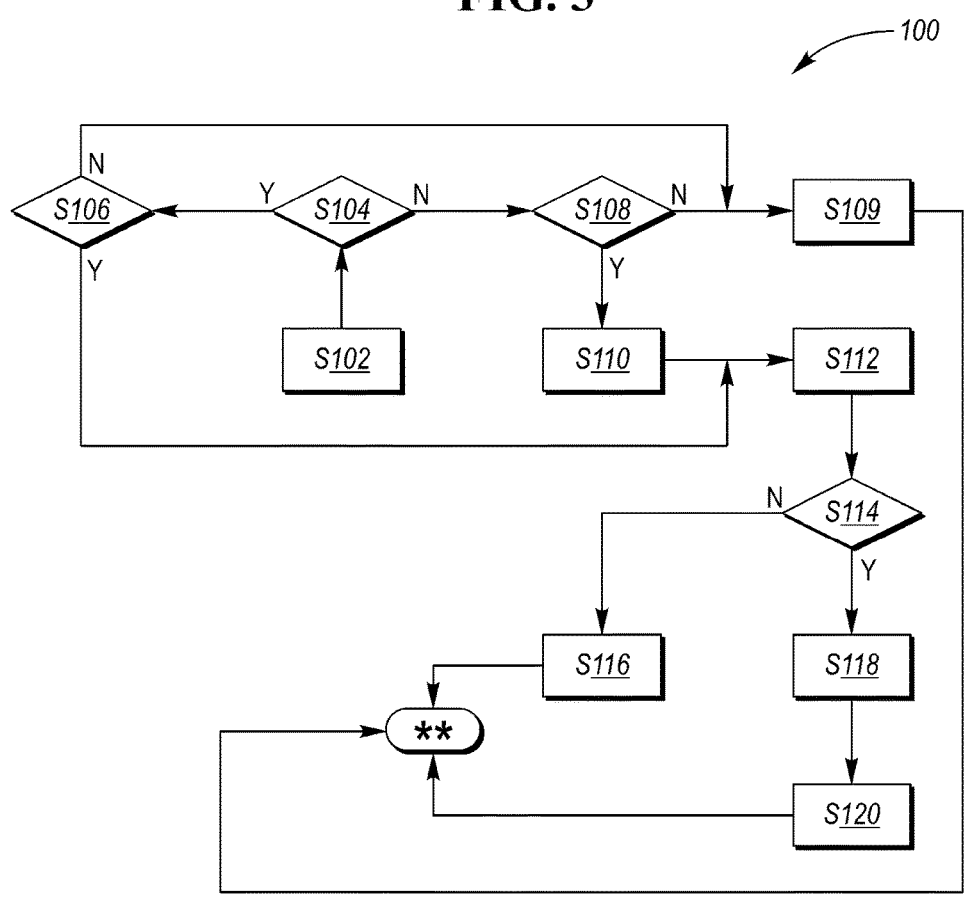
FIG. 4 is a flow chart describing an embodiment of a method for diagnosing and evaluating the engine starting system shown in FIG. 1.

Referring to the drawings, wherein like reference numbers refer to like components, a vehicle 10 is depicted in FIG. 1 as a non-limiting example embodiment of a top-level system having multiple interrelated subsystems. The vehicle 10 is used hereinafter to illustrate a non-limiting type of system that lends itself to the beneficial use of a hierarchical and holistic diagnostic method 100, an example of which is depicted in FIG. 4 and explained below. The method 100 may also be readily applied to non-vehicular systems and subsystems other than those described herein. For illustrative clarity and consistency, the vehicle 10 of FIG. 1 will be described hereinafter in the context of an engine starting system 28 without limiting applications of the method 100 to systems in the form of the vehicle 10 or the engine starting system 28.

The vehicle 10 includes an internal combustion engine (E) 12 that is coupled to a transmission (T) 14, with the latter having internal gear sets, rotating and/or braking clutches, and interconnecting members (not shown). The engine 12 may include an input member 13 and an output member 15. The output member 15 may be coupled to an input member 17 of the transmission 14 via a clutch device C1, e.g., a hydrodynamic torque converter assembly or a friction clutch. Engine torque (arrow $T_E$) is transferred via operation of the clutch device C1 from the output member 15 of the engine 12 to the input member 17 of the transmission 14. In turn, input torque (arrow $T_I$) is transferred from the input member 17, through the transmission 14, and to an output member 19 of the transmission 14, with output torque (arrow $T_O$) from the transmission 14 ultimately powering drive wheels 22 of the vehicle 10 via one or more drive axles 21.

The engine 12 is selectively cranked and started via the engine starting system 28, which is used herein for illustrative purposes as an example system to which the method 100 is applied. Specifically, the engine starting system 28 may include an auxiliary battery (B) 18 that, in a simplified illustrative embodiment, is electrically connected to a starter solenoid (S) 24 via a starter switch (SS), e.g., a key-operated or button-activated switch. The starter solenoid 24, when energized by the auxiliary battery 18 when the starter switch (SS) is closed, engages a starter motor ($M_S$) 25. The energized starter motor 25 in turn translates a pinion gear 23 into direct meshed engagement with an engine flywheel 16, the resultant rotation of which delivers a cranking torque (arrow $T_C$) to the input member 13 of the engine 12.

A fuel delivery system 30, which may be considered as a part of the engine starting system 28 in certain embodiments, may include a fuel pump ($P_F$) 32 and a fuel injector rail 34. When the input member 13 is cranked to a threshold rotational speed, combustible fuel (arrow F) is fed via the fuel pump 32 to the fuel injector rail 34. The engine starting function is discontinued when the threshold speed is attained, with the internal combustion process of the engine 12 thereafter sustaining rotation. Additionally, the rotating engine 12 may power an alternator (A) 11 to generate and deliver electricity to the battery 18. As is known in the art, such an alternator 11 includes a belt (not shown) or other drive element that rotates in conjunction with rotation of the engine 12 to generate electricity.

As part of the vehicle 10, a controller (C) 50 may be equipped with requisite memory (M) and a processor (P), as well as associated hardware and software such as an oscillator, input/output circuitry, etc. The memory (M) may include a computer-readable medium or media, including sufficient amount of read only memory, for instance magnetic or optical memory, on which is recorded computer-readable diagnostic instructions embodying executable portions of the method 100 described below. In some embodiments, a hierarchical precedence rule 60 assigning a relative priority level to fault modes of a given system, e.g., the engine starting system 28, is recorded in memory (M), with execution by the processor (P) of the diagnostic instructions embodying the method 100 causing the controller 50 to perform the various aspects of the method 100 as set forth below in FIG. 4.

Additionally as part of the method 100, the controller 50 receives input signals (arrow $CC_I$) from multiple components, subsystems, and/or electronic control units of the vehicle 10. After executing the method 100 using a fault report matrix 40 and a hierarchical precedence rule 60, the controller 50 transmits output signals (arrow $CC_O$) to an output device 33, e.g., a display screen, a cell phone, or an external/web-based server, such as a vehicle telematics system.

Figure 3:
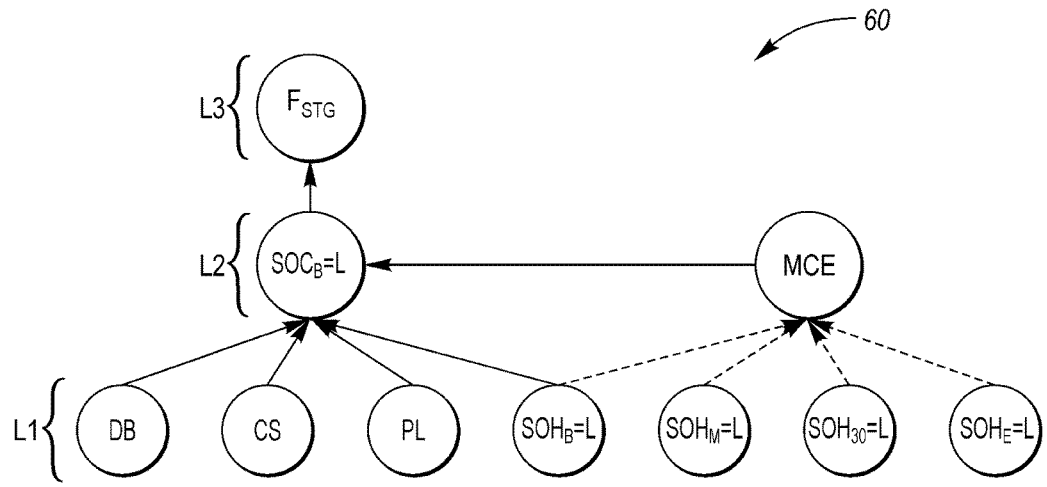
FIG. 3 is a sample graphical illustration of an application of hierarchical precedence within the fault report matrix of FIG. 2.

Examples of the fault report matrix 40 and the hierarchical precedence rule 60 are depicted in FIGS. 2 and 3, respectively. As part of the method 100, a particular system is first divided into constituent subsystems within the fault report matrix 40 of FIG. 2. Using the engine starting system 28 of FIG. 1 as an example, embedded systems (column ES) provide various embedded fault reports. As used herein, "embedded fault report" refers to a fault report that is automatically generated by a corresponding electronic control unit (ECU) for and/or logic of a given subsystem. "Subsystem fault report" refers to a report generated by a health management module, a body control module, engine control module, etc., which may include the controller 50 or other control devices in different embodiments, and which may involve sensor-based fault detection or ongoing subsystem-level state of health determination. For instance, in the vehicle 10 shown in FIG. 1, embedded fault reports and/or subsystem fault reports may pertain to functional diagnosis and prognosis of the starting system, including the battery 18, the starter solenoid 24, the starter motor 25, the alternator 11, and/or a critical component of the fuel delivery system 30 such as the fuel pump 32.

Embedded fault reports provide information on the status of the engine starting process. In the example of FIG. 2, the embedded system (ES) reports may include a first set of embedded faults ($F_1$), such as "no crank request", "no fault report", or "ECU short to ground". A second set of embedded faults ($F_2$) may describe a "starter disabled" condition, which may be further divided into "no engine rotation" ($F_{2A}$), "long injection delay" ($F_{2B}$), and "maximum cranking time expired" (Fac). A third set of embedded faults ($F_3$) may include "start and stall/engine shutdown during starting".

In addition to the embedded system fault reports, the fault report matrix 40 delineates possible root cause subsystems. In the example engine starting system 28, this may include the starter system 28 with the battery (B) 18, a charging system (CS) such as the alternator 11 and associated electrical sensors and connections, driver behavior (DB), multiple crank events (MCE) by numeric count, the fuel delivery system 30, and the engine (E) 12.

For each of the possible root cause systems, the fault report matrix 40 may identify specific fault modes. The battery 18 may exhibit a low state of charge ($SOC_L$), a low state of health ($SOH_L$), or parasitic loads and/or battery sensor faults ($F_{PL,B}$). The engine starting system 28 may have a low state of health ($SOH_L$) for the starter motor 25 or the starter solenoid 24. The charging system (CS) may exhibit a charging system fault ($F_{CS}$) in the form of a low state of health for the alternator 11, belt slip of the alternator 11, a broken electrical connection between the battery 18 and the alternator 11, or another charging system fault ($F_{CS}$). Regarding driver behavior (DB), this column may refer to a calibrated number of short trips or extended parking times, as compared to a calibrated time ($t_c$), or multiple crank events (MCE) by numeric count. The fuel delivery system 30 may have a low state of health, or the fuel pump 32 may be blocked, leak, or exhibit a sensor fault or other fault ($F_{30}$). One these faults may be a root cause of a reported fault condition.

While the particular manner in which such states of health or other status conditions are determined may vary within the intended scope of the disclosure, an example of such an approach may be found in U.S. Ser. No. 15/399,947, which is hereby incorporated by reference in its entirety. For the auxiliary battery 18 or other DC power source, for instance, such existing methods may include determining when the state of charge is low and then evaluating potential root causes associated with the low state of charge. A fault probability may be determined for each of candidate root cause, with a root cause having the highest fault probability being selected as the root cause for that particular subsystem.

Similarly, such subsystem-level approaches may define a state of health as an available electric power capacity of a fully-charged battery 18, e.g., as a ratio of the original electric power capacity of the battery 18. Such a state of health may be determined by periodically monitoring voltage, current, and temperature states of the battery 18 during operation and subjecting such measurements to a predefined empirical or physical model that may include differential equations and/or equivalent circuits that are reduced to executable algorithms and calibrations that reside in the battery controller (not shown). In one embodiment, the voltage, current and temperature states and the predefined empirical or physical model may be employed to determine an open-circuit voltage and/or an internal charging resistance of the battery 18, which may be analyzed to determine the state of health. Similar approaches may be used for other subsystems within the vehicle 10.

The fault report matrix 40 is then populated with a code or other information indicative of whether or not a fault report was generated, e.g., with "X" denoting the existence of such a fault report and "*" denoting the absence thereof.

Additionally, within the fault report matrix 40, each of the embedded system faults $F_1$, $F_{2A}$, $F_{2B}$, $F_{2C}$, and $F_3$ and each root cause subsystem is assigned a corresponding hierarchical priority, shown nominally as one of three relative priorities (1), (2), or (3) in FIG. 2. More priority levels may be used in other embodiments. In a row R1 having just one recorded fault, i.e., a low state of health of the auxiliary battery 18 with no other faults, the method 100 need not resort to the assigned hierarchy for fault reporting. However, in a row R2 having multiple possible fault modes, e.g., a "no-crank request fault" in which a low state of health of the auxiliary battery 18 is detected, along with battery sensor faults, a charging system fault, and a threshold number of short trips, the controller 50 of FIG. 1 may resort to a hierarchical precedence strategy to determine an appropriate control action, including outputting one or more fundamental root causes.

Hierarchical treatment of multiple possible fault modes may be described with particular reference to FIG. 3. In a simplified version, the hierarchical precedence rule 60 has three priority levels L1, L2, and L3, which correspond in the fault report matrix 40 of FIG. 2 to the priorities (1), (2), and (3). At the lowest level (L3) lies the fundamental effect of a detected failure, e.g., an ECU short-to-ground condition ($F_{STG}$). Level L2 is likewise a fundamental effect of a detected failure, albeit at a higher priority level in the hierarchy than level L3. For instance, a low state of charge of the battery 18 ($SOC_B$=L) and multiple cranking events (MCE) may represent the second level L2 of the hierarchy. At the highest level, L1, are the fundamental root causes for a given fault, e.g., a "no-start" fault of the vehicle 10 of FIG. 1. Such root causes may include driver behavior (DB), charging system (CS), and parasitic loads (PL), as well as low battery state of health ($SOH_B$=L), low starter state of health ($SOH_M$=L), low fuel delivery system state of health ($SOH_{30}$=L), and low engine state of health ($SOH_E$=L). Thus, the hierarchical precedence rule 60 is used to set forth the root causes and the effects in a descending order of priority.

FIG. 4 describes an example embodiment of the method 100 noted above, in the illustrative context of diagnosis of an engine starting process that is diagnosed using the approach set forth above, i.e., using the fault report matrix 40 and the assigned hierarchical precedence rule 60. While an onboard embodiment is described with reference to FIG. 4, as will be appreciated by one having ordinary skill in the art in view of this disclosure, the method 100 may reside as instructions on a service tool and/or remotely/accessed via the cloud rather than residing aboard the vehicle 10. For instance, the vehicle 10 may remotely communicate with a service station via a telematics unit as a possible embodiment of output device 33 of FIG. 1, with the method 100 executed offboard. Thus, while the controller 50 is described below for illustrative simplicity, the scope of the disclosure is intended to apply to onboard or offboard implementations in different embodiments.

Beginning with step S102, the controller 50 of FIG. 1 receives, as an example of a "predetermined condition" as used herein, a crank request indicative of a requested starting of the engine 12. Such a request may be generated by a body control module (BCM) in certain vehicular embodiments, with the BCM being part of the controller 50 or a separate device in different configurations. The controller 50 reads available fault reports of the particular subsystems that are being evaluated. For instance, step S102 may include reading one or more fault reports describing a state of the battery 18 and/or the starter motor 25, as well as any associated diagnostic codes indicative of a failure mode. The method then proceeds to step S104.

Step S104 includes determining if an embedded fault report is available for the present ignition cycle, i.e., the ignition cycle that is active and ongoing. The method 100 proceeds to step S106 if an embedded fault report is available for the present ignition cycle. The method 100 otherwise proceeds to step S108.

At step S106, the controller 50 determines if a subsystem fault report is available for the present ignition cycle. If so, the method 100 proceeds to step S112. The method 100 otherwise proceeds to step S109.

Step S108 may entail determining whether a subsystem fault report is available for a calibrated number of prior ignition cycles. The method 100 proceeds to step S110 if such reports are available, and to step S109 in the alternative if no prior subsystem fault reports are available.

Step S109 includes evaluating and examining the fault probabilities of the individual subsystems under evaluation. As part of step S109, the controller 50 determines that the least healthy subsystem is the likely root cause of the present fault mode, and in response to such a determination, the controller 50 executes a corresponding control action. For instance, the controller 50 may record a diagnostic code identifying the root cause/identified subsystem, or may transmit a text message to an operator of the vehicle 10 or a repair facility. The method 100 is then complete, a status that is indicated by "**" in FIG. 4.

Step S110 may include computing probabilistic weighted subsystem fault reports from the prior ignition cycles, e.g., by applying predetermined weights to the various faults so as to apply a greater weight to faults that are more critical and a lesser weight to faults that are deemed less critical. The method 100 then proceeds to step S112.

At step S112, the controller 50 next references the fault report matrix 40 and identifies the root cause of the present fault mode before proceeding to step S114.

At step S114, the controller 50 determines whether there are multiple root cause outputs from the fault report matrix 40, and then proceeds to step S116 when this is not the case.

Step S116 is executed for single root cause events. In this instance, the root cause for the engine no-start condition is identified and communicated in a suitable manner, such as via text message, registration of a corresponding diagnostic code, or the like. The method 100 is then complete, as indicated by "*" in FIG. 4.

Step S118 include referring to the hierarchical precedence rule 60 to select and identify the root cause. The method 100 then proceeds to step S120.

At step S120, the controller 50 outputs the root cause for the vehicle no-start event. The method 100 is then complete, as indicated by "**" in FIG. 4.

Thus, the method 100 may be recorded as instructions on the computer-readable medium of memory (M), as noted above. Such instructions, when executed by the processor (P), cause the controller 50 to record, in the fault report matrix 40, one or more fault reports indicative of one or more of the fault modes, and to use the hierarchical precedence rule 60 to determine the assigned relative priority level for such fault reports. This is done in response to a predetermined condition, such as a detected requested engine starting or ignition event. Execution of the instructions also causes the controller to identify a root cause subsystem as a particular subsystem having the highest of the assigned priority levels, and to execute a control action with respect to the system responsive to the identified root cause subsystem. Such a control action may include recording a diagnostic code and/or transmitting a message indicative of the identified root cause subsystem, or other suitable control actions within the scope of the disclosure.

The detailed description and the drawings or figures are supportive and descriptive of the disclosure, but the inventive scope is defined solely by the claims. While some of the best modes and other embodiments for carrying out the disclosure have been described in detail herein, various alternative designs and embodiments exist within the intended scope of this disclosure. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method for diagnosing a fault mode for a no-start condition in a powertrain system of a vehicle, the vehicle including a fuel delivery system and an electronic controller, the powertrain system having an engine fueled by the fuel delivery system and a starter system operable for starting the engine, the starter system including a solenoid relay, a starter solenoid, and a starter motor, the method comprising:
   transmitting, via the electronic controller of the vehicle in response to receiving an engine start request, an enable signal to the solenoid relay to thereby activate the starter solenoid and engage the starter motor with the engine;
   in response to a no-start event of the engine when the solenoid relay is enabled, retrieving, from a memory via the electronic controller, a hierarchical precedence rule that assigns relative priority levels to a plurality of fault modes of a plurality of vehicle subsystems;
   recording, in a fault report matrix in the memory via the electronic controller, a plurality of fault reports from the plurality of vehicle subsystems, each of the fault reports being indicative of a corresponding one of the fault modes;
   determining, via the electronic controller using the hierarchical precedence rule, a corresponding one of the assigned relative priority levels for each of the recorded fault reports;
   identifying one or more root cause subsystems of the no-start event as any of the vehicle subsystems with one of the recorded fault reports having a highest priority level of the assigned priority levels; and
   executing a control action with respect to the powertrain system of the vehicle via the electronic controller responsive to the one or more identified root cause subsystems, the control action including recording a diagnostic code and/or transmitting a message, each being indicative of the one or more identified root cause subsystems.

2. The method of claim 1, wherein recording the plurality of fault reports includes recording an embedded fault report from an electronic control unit of a corresponding one of the vehicle subsystems.

3. The method of claim 1, wherein recording the plurality of fault reports includes recording a component fault report identifying a detected fault of a corresponding one of the vehicle subsystems.

4. The method of claim 1, wherein the engine start request includes an ignition cycle or a key cycle initiating operation of the powertrain system.

5. The method of claim 1, wherein the identified one or more root cause subsystems includes multiple of the vehicle subsystems each having a corresponding one of the recorded fault reports with the highest priority level.

6. The method of claim 1, wherein the fault modes include: a low state of charge, a low state of health, and a sensor fault of an auxiliary battery; a low state of health of a starter motor or a starter solenoid; a charging system fault driver behavior with a calibrated number of short trips or extended parking times; an engine fault; and a blocked or leaking fuel pump or a sensor fault of a fuel delivery system.

7. The method of claim 1, further comprising computing probabilistic weighted subsystem fault reports from multiple prior ignition cycles by applying predetermined weights to the recorded fault reports such that identifying the one or more root cause subsystems includes applying a greater weight to fault reports deemed more critical and applying a lesser weight to fault reports deemed less critical.

8. The method of claim 1, further comprising recording, in the fault report matrix in the memory via the electronic controller, an absence of a fault report from an electronic control unit from a corresponding one of the vehicle subsystems, the absence indicating the electronic control unit is not operable.

9. A motor vehicle comprising:
a powertrain system with an internal combustion engine;
a fuel delivery system operable to fuel the internal combustion engine;
a starter system operable to start the engine, the starter system including a solenoid relay, a starter solenoid, and a starter motor;
a plurality of vehicle subsystems, which includes the powertrain system, fuel delivery system and starter system;
an electronic control unit operable for outputting an embedded fault report indicative of a fault mode of a corresponding one or more of the plurality of vehicle subsystems; and
an electronic controller in communication with the plurality of subsystems, wherein the electronic controller is programmed with a hierarchical precedence rule that assigns relative priority levels to a plurality of fault modes of the vehicle subsystems, the electronic controller being configured to:
responsive to receiving an engine start request, transmit an enable signal to the solenoid relay to thereby activate the starter solenoid and engage the starter motor with the engine;
responsive to a no-start event of the engine when the solenoid relay is enabled, record, in a fault report matrix stored in a memory device, a plurality of fault reports from the plurality of vehicle subsystems, each of the fault reports being indicative of a corresponding one of the fault modes;
determine, using the hierarchical precedence rule, a corresponding one of the assigned relative priority levels for each of the recorded fault reports;
identify one or more root cause subsystems of the no-start event as any of the vehicle subsystems with one of the recorded fault reports having a highest priority level of the assigned priority levels; and
execute a control action with respect to the powertrain system of the vehicle responsive to the one or more identified root cause subsystems, the control action including recording a diagnostic code and/or transmitting a message, each being indicative of the one or more identified root cause subsystems.

10. The motor vehicle of claim 9, wherein the fault reports include an embedded fault report from the electronic control unit.

11. The motor vehicle of claim 9, wherein the fault reports include a component fault report identifying a detected fault mode of one of the vehicle subsystems.

12. The motor vehicle of claim 9, wherein the engine start request includes an ignition cycle or a key cycle initiating operation of the powertrain system.

13. The motor vehicle of claim 9, wherein the identified one or more root cause subsystems includes multiple of the vehicle subsystem each having a corresponding one of the recorded fault reports with the highest priority level.

14. The motor vehicle of claim 9, wherein the fault modes include: a low state of charge, a low state of health, and a sensor fault of an auxiliary battery; a low state of health of a starter motor or a starter solenoid; a charging system fault driver behavior with a calibrated number of short trips or extended parking times of; an engine fault; and a blocked or leaking fuel pump or a sensor fault of a fuel delivery system.

15. A computer-readable medium on which is recorded a hierarchical precedence rule that assigns relative priority levels to a plurality of fault modes of a vehicle and diagnostic instructions, the execution of which by an electronic controller causes the electronic controller to:
transmit, in response to receiving an engine start request, an enable signal to a solenoid relay to thereby activate a starter solenoid and engage a starter motor with an engine;
in response to a no-start event of the engine when the solenoid relay is enabled, record, in a fault report matrix stored in a memory device, a plurality of fault reports from a plurality of vehicle subsystems, each of the fault reports being indicative of a corresponding one of the fault modes;
determine, using the hierarchical precedence rule, a corresponding one of the assigned relative priority levels for each of the recorded fault reports;
identify one or more root cause subsystems of the no-start event as any of the vehicle subsystems with one of the recorded fault reports having a highest priority level of the assigned priority levels; and
execute a control action with respect to a powertrain system of the vehicle responsive to the one or more identified root cause subsystems, the control action including recording a diagnostic code and/or transmitting a message, each being indicative of the one or more identified root cause subsystems.

16. The computer-readable medium of claim 15, wherein the fault reports include an embedded fault report from an electronic control unit of a corresponding subsystem.

17. The computer-readable medium of claim 15, wherein the fault reports include a component fault report identifying a detected fault of one or more of the subsystems.

18. The computer-readable medium of claim 15, wherein the engine start request includes an ignition cycle or a key cycle initiating operation of the powertrain system.

19. The computer-readable medium of claim 15, wherein the identified one or more root cause subsystems includes multiple of the vehicle subsystems each having a corresponding one of the recorded fault reports with the highest priority level.

20. The computer-readable medium of claim 19, wherein the fault modes include: a low state of charge, a low state of health, and a sensor fault of an auxiliary battery; a low state of health of a starter motor or a starter solenoid; a charging system fault driver behavior with a calibrated number of short trips or extended parking times; an engine fault; and a blocked or leaking fuel pump or a sensor fault of a fuel delivery system.

* * * * *